US009639196B2

(12) United States Patent
Hunt et al.

(10) Patent No.: US 9,639,196 B2
(45) Date of Patent: May 2, 2017

(54) DYNAMIC HARDWARE CONTROLS WITH HAPTIC AND VISUAL FEEDBACK

(71) Applicant: Sony Corporation, Tokyo (JP)

(72) Inventors: Alexander Hunt, Tygelsjö (SE); Magnus Johansson, Dösjebro (SE)

(73) Assignees: SONY CORPORATION, Tokyo (JP); SONY MOBILE COMMUNICATIONS, INC., Tokyo (JP)

( * ) Notice: Subject to any disclaimer, the term of this patent is extended or adjusted under 35 U.S.C. 154(b) by 26 days.

(21) Appl. No.: 14/551,417

(22) Filed: Nov. 24, 2014

(65) Prior Publication Data

US 2015/0153886 A1    Jun. 4, 2015

(30) Foreign Application Priority Data

Dec. 2, 2013  (EP) .................................... 13195259

(51) Int. Cl.
*G06F 3/041*   (2006.01)
*G06F 3/01*   (2006.01)

(52) U.S. Cl.
CPC ............ *G06F 3/0414* (2013.01); *G06F 3/016* (2013.01); *G06F 3/017* (2013.01); *G06F 3/041* (2013.01); *G06F 3/0416* (2013.01)

(58) Field of Classification Search
CPC ...... G06F 3/017; G06F 3/0416; G06F 3/0414; G06F 3/041; G06F 3/016
See application file for complete search history.

(56) References Cited

U.S. PATENT DOCUMENTS

| 7,411,142 | B2* | 8/2008 | Jung | ...................... H01H 13/83 |
|---|---|---|---|---|
| | | | | 200/314 |
| 2006/0103634 | A1* | 5/2006 | Kim | ...................... G06F 3/016 |
| | | | | 345/173 |
| 2007/0152974 | A1* | 7/2007 | Kim | ...................... G06F 3/016 |
| | | | | 345/168 |
| 2007/0152982 | A1* | 7/2007 | Kim | ...................... G06F 3/016 |
| | | | | 345/173 |
| 2009/0225022 | A1* | 9/2009 | Tolbert | .................. G02F 1/1506 |
| | | | | 345/105 |
| 2010/0321330 | A1 | 12/2010 | Lim et al. | |
| 2014/0111480 | A1* | 4/2014 | Kim | ...................... G06F 3/016 |
| | | | | 345/175 |

FOREIGN PATENT DOCUMENTS

WO    2008125130 A1   10/2008

* cited by examiner

*Primary Examiner* — Ariel Balaoing
(74) *Attorney, Agent, or Firm* — Tucker Ellis, LLP

(57) ABSTRACT

The present invention presents a mobile electronic device comprising dynamic hardware controls and a method for controlling dynamic hardware controls. The mobile electronic device comprises a pressure sensing film arranged to detect a pressure applied on at least one portion of at least one side of the mobile electronic device and electroactive polymer film with a conductive coating arranged overlaying the pressure sensing film. The electroactive polymer film comprises at least one deformable segment that may be deformed temporarily by the application of a voltage over the at least one deformable segment in the electroactive polymer film, the mobile electronic device further comprises a control unit arranged to control the dynamic hardware controls.

16 Claims, 5 Drawing Sheets

DYNAMIC HARDWARE CONTROLS WITH HAPTIC AND VISUAL FEEDBACK

RELATED APPLICATION

This application claims priority under 35 U.S.C. §119 based on European Patent Application No. 13195259.0, filed Dec. 2, 2013, the disclosure of which is hereby incorporated by reference herein.

TECHNICAL FIELD

The present invention relates to a mobile electronic device and to a method for controlling dynamic hardware controls in a mobile electronic device.

BACKGROUND ART

Today, in mobile electronic devices, there are generally two variants of buttons, normal physical, hardware buttons and touch buttons. The hardware buttons are defined per product basis and are specific for just that type of device and they are not changed once defined.

The touch buttons are totally customized and may vary per application and use case basis. The touch buttons however lack the physical feedback compared to the hardware buttons. They are also limited to the display area of the device.

In US 2007/152982 to Kim Kyu-Yong et al, an input device for adaptively providing various input modes and control of stiffness of buttons pressed by the user is disclosed.

There is therefore a need for a mobile electronic device that is provided with dynamic hardware controls providing haptic feedback to a user and which position and function is customizable.

SUMMARY OF THE INVENTION

With the above description in mind, then, an aspect of the present invention is to provide a mobile electronic device that comprises dynamic hardware controls and a method for controlling dynamic hardware controls in a mobile electronic device to provide the ability for a user or software to adapt the position, appearance and function of dynamic hardware controls on at least one side of a mobile electronic device depending on use case scenario and further enabling the dynamic hardware controls to disappear when not used.

With the above description in mind, then, an aspect of the present disclosure provides a device and a method for dynamic hardware controls in a mobile electronic device, which seeks to mitigate, alleviate, or eliminate one or more of the above-identified deficiencies in the art and disadvantages singly or in any combination.

These and further aspects are achieved by a mobile electronic device comprising:
- a pressure sensing film arranged to detect a pressure applied on at least one portion on at least one side of the mobile electronic device,
- a electroactive polymer film, with a conductive coating, arranged overlaying the pressure sensing film comprising at least one segment not being attached to the pressure sensing film thereby forming deformable segments configured to be temporarily deformed by the application of a voltage over the at least one deformable segment in the electroactive polymer film and
- a control unit configured to interpret signals associated with the detected pressure, received from the pressure sensing film and to control a voltage applied over said at least one deformable segment, thereby controlling the deformation of said at least one deformable segment as a function of the applied pressure detected by the pressure sensing film.

By providing a mobile electronic device with dynamic hardware controls comprising deformable segments being controlled by a control unit in correspondence or as a response to pressure on an underlying pressure sensitive film, an efficient, intuitive and precise way of enabling a user or software of a mobile electronic device to generate dynamic hardware control(s) in desired positions on at least one side of the mobile electronic device is achieved and that further enables a user to perform inputs on dynamic hardware control(s) in desired positions on at least one side of the mobile electronic device. A user of the mobile electronic device comprising dynamic hardware controls can thereby easily customize the functions of each dynamic hardware control according to preference and situation and the dynamic hardware controls can provide physical feedback to the user when pressed. Furthermore, the at least one side of the mobile electronic device will appear as if it has no hardware buttons, when the deformable segment(s) are in a non-deformed state, making the general appearance of the mobile electronic device more aesthetically pleasing.

According to another aspect of the invention, a mobile electronic device is provided, wherein the pressure sensitive film comprises a plurality of pressure sensing segments each segment being configured to detect an individual pressure on a predetermined portion of a side of the mobile electronic device and wherein the electroactive polymer film comprises a plurality of deformable segments. By providing a plurality of pressure sensing segment, each scanning for pressures on a predetermined portion of a side of the mobile electronic device, a way of individually controlling a plurality of deformable segments simultaneously in correspondence to a pressure applied on each of said pressures sensing segment is provided.

According to yet another aspect of the invention, a mobile electronic device is provided, wherein each pressure sensing segment is a parallel plate capacitor or a resistive sensor capable of detecting contact pressure of an object in contact with a portion of the mobile electronic device.

According to a further aspect of the invention, a mobile electronic device is provided, wherein a plurality of the deformable segments are arranged in desired positions on at least one side of the mobile electronic device aligned with positions of underlying corresponding pressure sensing segments and wherein the deformable segments are arranged to individually deform such that they together with underlying pressure sensing segments form dynamic hardware controls on at least one side of the mobile electronic device. By aligning deformable segments and pressure sensing segments, each arranged in a predetermined position on a side of the mobile electronic device, it is possible to form dynamic hardware controls in which a deformation of a deformable segment can be precisely controlled in correspondence to a pressure detected by an underlying pressure sensing segment.

According to another aspect of the invention, a mobile electronic device is provided, wherein each deformable segment is dimensioned to be smaller than an underlying corresponding pressure sensitive segment. By making the deformable segments slightly smaller than the underlying pressure sensing segments, a higher accuracy in the pressure detection is achieved that can be achieved attributed to the reduction of air gaps etc.

According to yet another aspect of the invention, a mobile electronic device is provided wherein the electroactive polymer film is transparent, and configured to function as a light guide for at least one light source comprised within the mobile electronic device in order to illuminate the at least one deformable segment. By providing an electroactive polymer film functioning as a light guide for light emitted from a light source, the number of light sources and related components can be kept at a minimum while still maintaining a sufficient illumination of the deformed deformable segments. By minimizing the number of light sources, less battery power is needed for the illumination of the deformable segments. The thickness of the layer may be optimized for effective, adaptable and precise light guiding and optimized refractive index. One thin layer may be used instead of one thick layer. This translates into a lowering of the requirements on the light sources, allowing the number of light sources to be reduced and/or the strength of the light sources to be lowered. This simplifies the control of the light guiding while making the guiding of the light more flexible and adaptable to different use case scenarios and applications and further improving the dynamic hardware control.

According to yet another aspect of the invention, a mobile electronic device is provided, wherein the deformable segments in the electroactive polymer film, when deformed, are configured to redirect the light outwards at an angle against the outer surface of the electroactive polymer that is sufficient to ensure the light can escape out of the electroactive polymer film and become visible to a user. By allowing the deformation of the deformable segments to redirect the light outwards, no further component is needed for light redirection and a deformed deformable segment will thereby simultaneously as the deformation occurs also be illuminated to a user. By providing light directing segments in the electroactive polymer film itself functioning as a light guide for light emitted from a light source, the number of light sources and related components can be kept at a minimum while still maintaining a sufficient illumination of the deformed deformable segments themselves. By minimizing the number of light sources, less battery power is needed for the illumination of the actual deformable segments. The thickness of the layer may be optimized for effective, adaptable and also precise light guiding and optimized refractive index. This translates into a lowering of the requirements on the light sources, allowing the number of light sources to be reduced and/or the strength of the light sources to be lowered. This simplifies the control of the light guiding while making the guiding of the light more flexible and adaptable to different use case scenarios and applications and further improving the dynamic hardware control.

According to a further aspect of the invention, a mobile electronic device is provided wherein the deformable segments in the electroactive polymer film comprises at least one perforation in at least an outer conductive coating layer that allows light to escape through the conductive coating layer and become visible to a user. In a scenario, in which the conductive coating layer is not transparent, it is necessary to provide perforations in the conductive coating layer to allow light to be visible to a user. The perforations may be of any suitable shape e.g. indicating a function of the button or be small enough not to be visible to the naked eye but still letting light pass through.

According to still another aspect of the invention, a mobile electronic device is provided wherein the mobile electronic device further comprises a light guide layer being transparent and functioning as a light guide for at least one light source to let light escape out through the light guide layer and become visible to a user. By providing a light guide layer specifically adapted for guiding light that does not have to function as an electroactive polymer film, higher efficiency and less losses of light can be achieved. This translates into a lowering of the requirements on the light sources, allowing the number of light sources to be reduced and/or the strength of the light sources to be lowered. The thickness of the layers may be optimized for effective, adaptable and precise light guiding and optimized refractive index. Two thin layers may be used instead of one thick layer. Two thick layers may also be used. This translates into a lowering of the requirements on the light sources, allowing the number of light sources to be reduced and/or the strength of the light sources to be lowered. This simplifies the control of the light guiding while making the guiding of the light more flexible and adaptable to different use case scenarios and applications and further improving the dynamic hardware control.

According to yet another aspect of the invention, a mobile electronic device is provided wherein the light guide layer is positioned outside and adjacent to the electroactive polymer film and configured to redirect the light outwards from the light guide layer to let light escape out through the light guide layer and become visible to a user. By providing a light guide layer specifically adapted for guiding light that does not have to function as an electroactive polymer film, higher efficiency and less losses of light can be achieved. This translates into a lowering of the requirements on the light sources, allowing the number of light sources to be reduced and/or the strength of the light sources to be lowered. The thickness of the layers may also be optimized for more effective and precise light guiding and refractive index. Two thin layers may be used instead of one thick layer. Two thick layers may also be used. This translates into a lowering of the requirements on the light sources, allowing the number of light sources to be reduced and/or the strength of the light sources to be lowered, also simplifying the control of the light guiding while making the guiding of the light more flexible and adaptable to differing use case scenarios and applications and further improving the dynamic hardware control.

According to yet another aspect of the invention, a mobile electronic device is provided wherein the light guide layer is attached to the electroactive polymer film and configured to redirect the light outwards at an angle against an outer surface of the light guide layer that is sufficient to ensure light to escape out through the outer surface of the light guide layer and become visible to a user. By allowing the deformation of the deformable segments to redirect the light outwards, no further component is needed for light redirection and a deformed deformable segment will thereby simultaneously as the deformation occurs also be illuminated to a user. By providing a light guide layer specifically adapted for guiding light that does not have to function as an electroactive polymer film, higher efficiency and less losses of light can be achieved. This translates into a lowering of the requirements on the light sources, allowing the number of light sources to be reduced and/or the strength of the light sources to be lowered. By providing a light guide layer specifically adapted for guiding light at a sufficient angle, higher efficiency and less losses of light can be achieved. Hence, a more effective use of the light is achieved. Moreover, the thickness of the layers may be easily optimized for more effective and precise light guiding and refractive index.

Two thin layers may be used instead of one thick layer. Two thick layers may also be used. This translates into a lowering of the requirements on the light sources, allowing the number of light sources to be reduced and/or the strength of the light sources to be lowered, also simplifying the control of the light guiding while making the guiding of the light more flexible and adaptable to differing use case scenarios and applications and further improving the dynamic hardware control.

According to another aspect of the invention, a mobile electronic device is provided wherein the mobile electronic device further comprises a light guide layer being transparent and functioning as a light guide for at least one light source and wherein the light guide layer is positioned outside and adjacent to the electroactive polymer film and wherein the light guide layer is attached to the electroactive polymer film and configured to redirect the light outwards at an angle against the outer surface of the light guide layer that is sufficient to ensure the light can escape out through the outer surface of the light guide layer and become visible to a user. By providing a light guide layer specifically adapted for guiding light that does not have to function as an electroactive polymer film, higher efficiency and less losses of light can be achieved. This translates into a lowering of the requirements on the light sources, allowing the number of light sources to be reduced and/or the strength of the light sources to be lowered.

The above and further aspects are also achieved by a method for controlling dynamic hardware controls on a mobile electronic device comprising a pressure sensing film arranged to detect the pressure on at least one portion on at least one side of the mobile electronic device and a electroactive polymer film, with a conductive coating, arranged overlaying the pressure sensing film. The electroactive polymer film comprises at least one segment not being attached to the pressure sensing film thereby forming deformable segments that may be deformed temporarily by the application of a voltage over the at least one deformable segment in the electroactive polymer film. The mobile electronic device further comprises a control unit, wherein the method comprises the steps of:
  detecting a pressure through scanning of the pressure sensitive film, by the control unit receiving signals from the pressure sensitive film corresponding to a pressure on the pressure sensitive film in order to detect contact by an object, and
  controlling temporary deformation of at least one deformable segment by the control unit interpreting signals from the pressure sensing film to dynamically apply and control a voltage, as a response to the detected pressure.

The scanning of the pressure sensitive film is performed by the control unit receiving and analyzing signals from the pressure sensitive film corresponding to a pressure on the pressure sensing film wherein the scanning may be performed at a certain frequency depending on a mode of the mobile electronic device.

The method for controlling deformable segments as a response to and in correspondence to a detected pressure provides dynamic hardware controls on at least one side of a mobile electronic device that can be accurately controlled and adapted according to the pressure applied to the deformable segment. Furthermore, a method for controlling dynamic hardware controls is provided, that enables dynamic hardware controls to appear when desired and temporarily assume the shape and feel of a traditional button and automatically disappear when reset or deactivated simulating the feeling of a mechanical hardware button.

According to yet another aspect of the invention, a method for controlling dynamic hardware controls on a mobile electronic device is provided wherein the method further comprises resetting said deformable segment to a non-deformed state by removing the applied voltage, when the control unit has determined that a pressure threshold is reached based on the received signals from the pressure sensing film, and executing a software key input event in said mobile electronic device directly after or simultaneously as the removal of the applied voltage. Said software key input event may be executed continuously if the pressure that is detected by the pressure sensitive film is maintained after the resetting of the deformable segment until the pressure is removed. The resetting of the deformable segment by removal of the voltage applied over said deformable segment provides a user with a feel and feedback of pressing a mechanical button. By the execution of a software key input event, a pressing of a deformed deformable segment can be coupled to a software key input event, e.g. raising the volume of a speaker, in the mobile electronic device. The user may execute the software key input event by pressing the deformed deformable segment until it collapses by the removal of the applied voltage upon which the software key input event will be executed, simulating a mechanical button. Thereby can the customization ability of touch buttons be combined with the feel and feedback of hardware mechanical buttons.

According to a further aspect of the invention, a method for controlling dynamic hardware controls on a mobile electronic device is provided, wherein the detection of pressure by the pressure sensitive film is performed by scanning for individual pressures on a plurality of pressure sensing segments. By providing a method for pressure detection by scanning for individual pressures on a plurality of pressure sensing segments, several individual pressures can be detected and located simultaneously by the predetermined positions of the pressure sensing segments. This allows for more precise control of the deformable segments.

According to another aspect of the invention, a method for controlling dynamic hardware controls on a mobile electronic device is provided, wherein the method further comprises determining by a user or software application which pressure sensing segments and deformable segments that are active and deformation of said active deformable segments initiated by other means than detection of pressure on the pressure sensitive film. By allowing a user or software application to determine which pressure sensing segments and deformable segments that are active, the mobile electronic device can be customized depending on demand. For instance, if a user only wishes to use dynamic hardware controls on one side of the mobile electronic device, the user can choose to deactivate all other dynamic hardware controls i.e. all other pressure sensing segments and corresponding deformable segments, by selecting in the mobile electronic device which dynamic hardware controls that should be active. Furthermore, an application can set a predetermined outlay of dynamic hardware controls, e.g. a game that demands a particular preset control outlay or a camera application that activates a particular trigger by activating a particular dynamic hardware control. Furthermore, by enabling deformation of the active deformable segments by other means than detection of pressure on the pressure sensitive film, a user can easily locate the positions of the active deformable segments without having to physically press them to appear.

According to yet another aspect of the invention, a method for controlling dynamic hardware controls on a mobile electronic device is provided wherein a user or software may determine what software key input event that is to be executed when a certain dynamic hardware control is pressed with sufficient force to reach the pressure threshold. By providing a method where a user or software may adapt the software key input event that is executed by a certain dynamic hardware control, a high level of customization of the outlay of the dynamic hardware controls is achieved. A user or software may thereby choose the software key input event associated with each dynamic hardware control depending on situation or use case scenario.

According to a further aspect of the invention, a method for controlling dynamic hardware controls on a mobile electronic device is provided, wherein the method further comprises switching on a light source to illuminate the deformable segment when the deformable segment is deformed and switching off the light source when the deformable segment is reset. By activating and deactivating, i.e. switching on and off, a light source as the deformable segment is deformed, the deformable segment is illuminated to a user while minimizing the activated time of the light source.

BRIEF DESCRIPTION OF THE DRAWINGS

The present technique will be more readily understood through the study of the following detailed description of the aspects together with the accompanying drawings, of which.

It should be added that the following description of aspects of the invention is for illustration purposes only and should not be interpreted as limiting the disclosure exclusively to these aspects.

DETAILED DESCRIPTION

Aspects of the present invention will be described more fully hereinafter with reference to the accompanying drawings, in which examples of the invention are shown. This invention may, however, be realized in many different forms and should not be construed as limited to the examples set forth herein. Rather, these examples are provided so that this disclosure will be thorough and complete, and will fully convey the scope of the invention to those skilled in the art. Like reference signs refer to like elements throughout.

The present invention will be exemplified using a mobile electronic device such as a mobile phone. However, it should be appreciated that the invention is as such equally applicable to other electronic devices. Examples of such devices may for instance be any type of mobile phone, laptop (such as standard, ultra-portables, netbooks, and micro laptops), handheld computers, portable digital assistants, tablet computers, gaming devices, accessories to mobile phones, etc.

Figure 1:
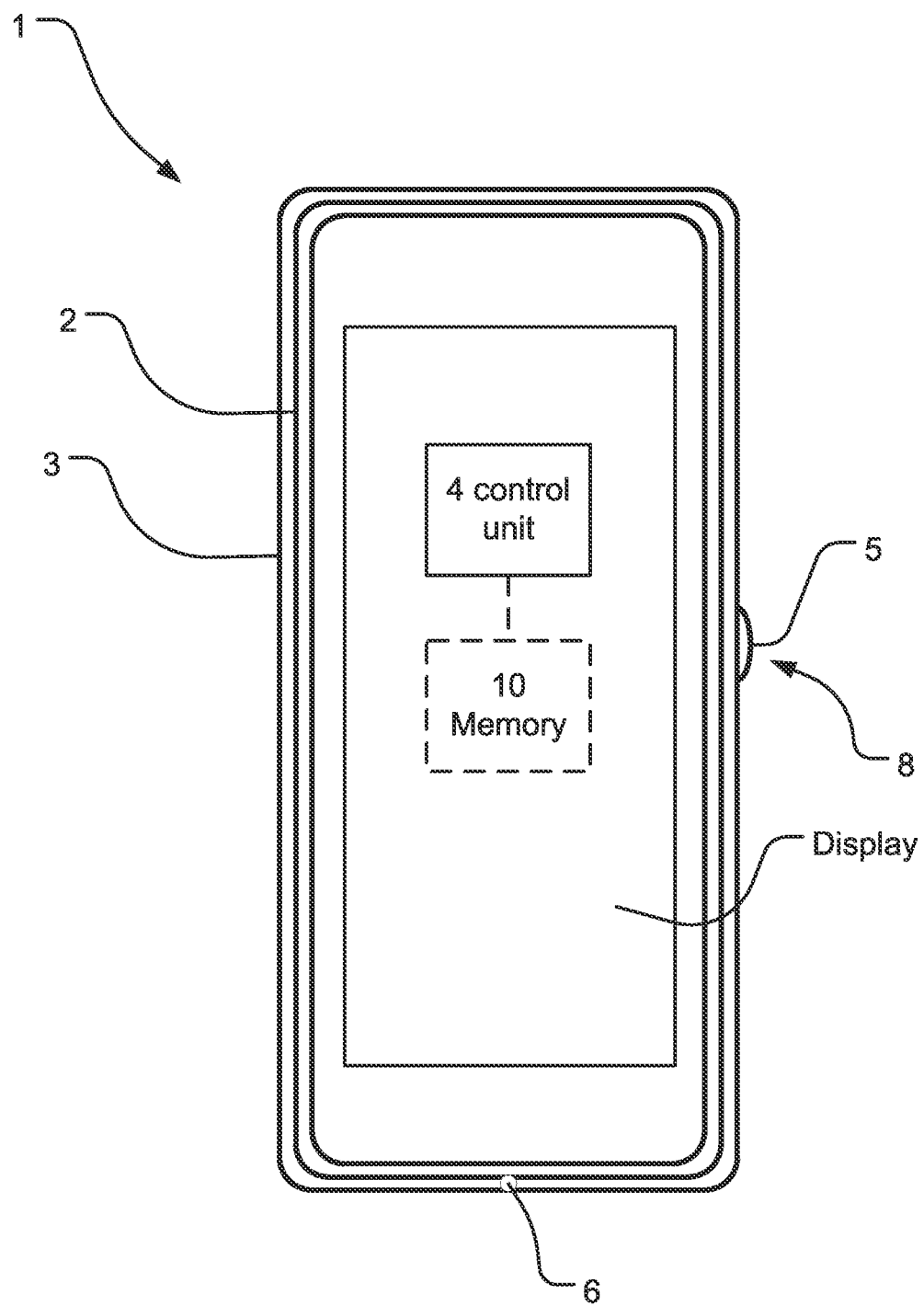
FIG. 1 illustrates a front view of a mobile electronic device where the present invention is implemented.

FIG. 1 illustrates a mobile electronic device 1 where the present invention is implemented.

The mobile electronic device 1 comprises a pressure sensing film 2 on at least one side of the mobile electronic device 1 for measuring pressure(s) on at least one portion of at least one side of the mobile electronic device 1. The pressure sensitive film 2 may be a capacitive pressure sensing film, a resistive pressure sensing film or the like, the technology of capacitive and resistive pressure sensing is known in the art and will not be described in further detail in this disclosure. The pressure sensitive film 2 may further comprise a plurality of pressure sensing segments 21 (FIG. 2), each being able to transmit and/or adapt a signal indicating a pressure on the segment 21 to a control unit 4. In the invention, the pressure sensing segments 21 are parallel plate capacitive pressure sensors. In the invention, the pressure sensing segments 21 are resistive pressure sensors.

The mobile electronic device 1 further comprises an electroactive polymer film 3 that in the invention is positioned outside, overlaying and directly adjacent to the pressure sensitive film 2. The electroactive polymer may be e.g. an ionic electroactive polymer. The ionic electroactive polymer may comprise five layers, top and bottom being encapsulation, layers 2 and 4 are anode and cathode, which may be switchable, and in the middle the polymer. The electroactive polymer film may further comprise conjugated polymers used as actuator materials e.g. Polypyrrole (PPy), Poltthiophene (PT), Polyethylenedioxythiophene (PEDOT) etc. In the invention the electroactive polymer film 3 is positioned outside of the pressure sensitive film 2. The electroactive polymer film 3 may be arranged with a separate light guide layer 7 (FIG. 3) arranged overlaying the electroactive polymer film directly adjacent to the electroactive polymer film 3. I.e. the electroactive polymer film 3 may be positioned below i.e. inside of a separate light guide layer 7.

The electroactive polymer film 3 further comprises an electrically conductive coating 9, preferably a metal coating 9, on at least one side of the electroactive polymer film 3. In the invention, both sides of the electroactive polymer film 3 are coated with a conductive coating 9. The coating may be a transparent conductive film being a metal mesh film with a low ohm/sq ratio.

Furthermore, the electroactive polymer film 3 comprises at least one, preferably a plurality, of deformable segments 5. A deformable segment is a segment that deforms by the application of a voltage that is applied over said deformable segment. By controlling the polarity and voltage, both direction and degree of deformation or pressing resistance can be controlled.

The shape and outline of the deformable segments 5 are defined by their constraints, i.e. the deformable segments are formed in the electroactive polymer film 3 by a segment of the film 3 not being attached to an underlying layer and thereby allowing that segment to deform during an application of a voltage over the segment 5. Each deformable segment 5 further comprises individual connections for applying an individual voltage to each deformable segment 5. Preferably, the shape and outline of the deformable segments 5 is in the shape of a button dimensioned to be arranged on at least one side of the mobile electronic device 1.

The deformable segment(s) 5 may be arranged such that they are positioned essentially aligned with a corresponding pressure sensing segment 21 to enable the pressure sensing segment 5 to transmit signals corresponding to a pressure on the deformable segment 5. This allows the deformable segment 5 in combination with an underlying pressure sensing segment 21 to function as dynamic hardware controls 8 with the deformation of the deformable segments 5 being controlled by the control unit 4 in correspondence to a pressure on the deformable segment 5 that is detected by an underlying pressure sensing segment 21. The control unit 4, or processing circuitry 4 that may be constituted by any suitable Central Processing Unit, CPU, microcontroller, Digital Signal Processor, DSP, etc. capable of executing computer program code. The computer program may be stored in a memory 10. The memory 10 can be any combination of a Read And write Memory, RAM, and a Read Only Memory, ROM. The memory 10 may also comprise persistent storage, which, for example, can be any single one or combination of magnetic memory, optical memory, or solid state memory or even remotely mounted memory.

According to one aspect of the proposed technique, the deformable segments 5 are controlled directly by the control unit 4 without input signals from the pressure sensing segments 21, e.g. may the deformable segments 5 be activated by the user by input on a touch screen, physical button, proximity sensor etc. to allow easy location of the dynamic hardware controls 8. At least one light source 6 may also be activated and deactivated essentially simultaneously as the deformable segments 5 are deformed to illuminate the deformed deformable segments 5.

According to one aspect of the proposed technique, the deformable segment(s) 5 are positioned outside of the immediate surroundings of pressure sensing segments 21, i.e. not aligned with each other, allowing them to function as tactile and/or visual indicators. A possible use scenario may be Braille writing, enabling a matrix with predetermined size and spacing of deformable segments 5 to deform individually according to a Braille letter or number as read to a user, changing letter either automatically or by input from a user.

According to one further aspect of the proposed technique, the electronic device 1 further comprises at least one light source 6, arranged such that the light produced may be guided in the electroactive polymer film 3, allowing the deformable segments 5, when deformed, to direct the light outwards and make the deformable segment 5 visible to a user. This is enabled by the electroactive polymer being transparent allowing light to be guided. In the invention the electronic device may comprise a separate light guide layer 7 arranged outside of and adjacent to the electroactive polymer film 3, being attached to the electroactive polymer film 3. The light guide layer 7 may be any type of material being transparent and flexible, e.g. PC or PMMA, such that bending of the layer according to the deformation of the deformable segments 5 is possible.

According to a further aspect of the proposed technique, the electroactive polymer film 3 further comprises perforations in at least the outer conductive coating layer 9 to allow light to pass through when the deformable segments 5 are deformed. The perforations may be in the shape of slits, circles, squares or any suitable shape for indicating and illuminating a location of a deformed deformable segment 5 to a user. The perforations may also be small enough not be detectable by a user, but still letting enough light to pass through when the light source 6 is activated to illuminate a deformed deformable segment 5 to a user. The perforations may also be dimensioned such that when the deformable segments 5 are in a non-deformed state, the perforations remain closed and open when the deformable segments 5 are deformed through the expansion of the deformable segments 5 and thereby not letting any light escape when in the non-deformed state and opening to let light out when deformed.

Figure 2:
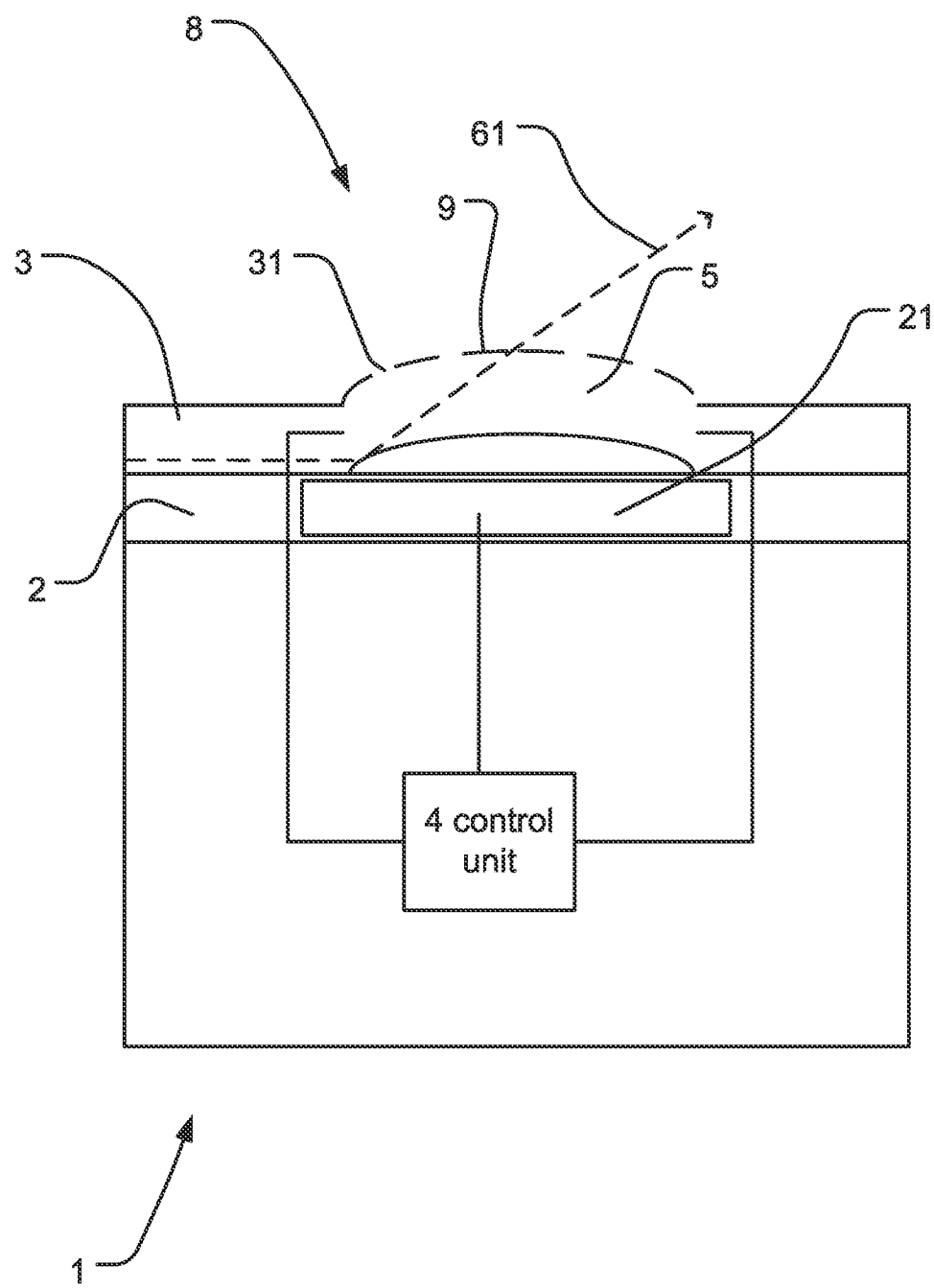
FIG. 2 illustrates a cross section of one side of a mobile electronic device where the present invention is implemented.

FIG. 2 illustrates a cross section of a portion of one side of the mobile electronic device 1 showing a dynamic hardware control 8 comprising a deformable segment 5 in a deformed state i.e. when a voltage is applied to the deformable segment 5. The required voltage for deformation of the deformable segment 5 is low, well within what is achievable in a conventional mobile electronic device 1, and variation of the voltage is interpreted into varying amounts of deformation or pressure resistance in the deformable segment 5 i.e. a low voltage results in a soft button/small deformation and a higher voltage results in a harder button/larger deformation. The control unit 4 is shown being connected to both the deformable segment 5 and the pressure sensing segment 21 enabling the control unit 4 to adapt the voltage applied to an individual deformable segment 5 in correspondence to a pressure detected by an individual underlying pressure sensing segment 21. Only one deformable segment 5 and pressure sensitive segment 21 is shown but it is to be understood that a plurality of pressure sensing segments 21 and/or deformable segments 5 may be connected to the control unit 4 and being controlled to operate simultaneously independent of each other.

The deformation of the deformable segment 5 redirects the light 61 that is guided through the electroactive polymer film 3 enabling it to escape out of the electroactive polymer film 3 through the perforations 31 in the conductive coating 9.

Figure 3:
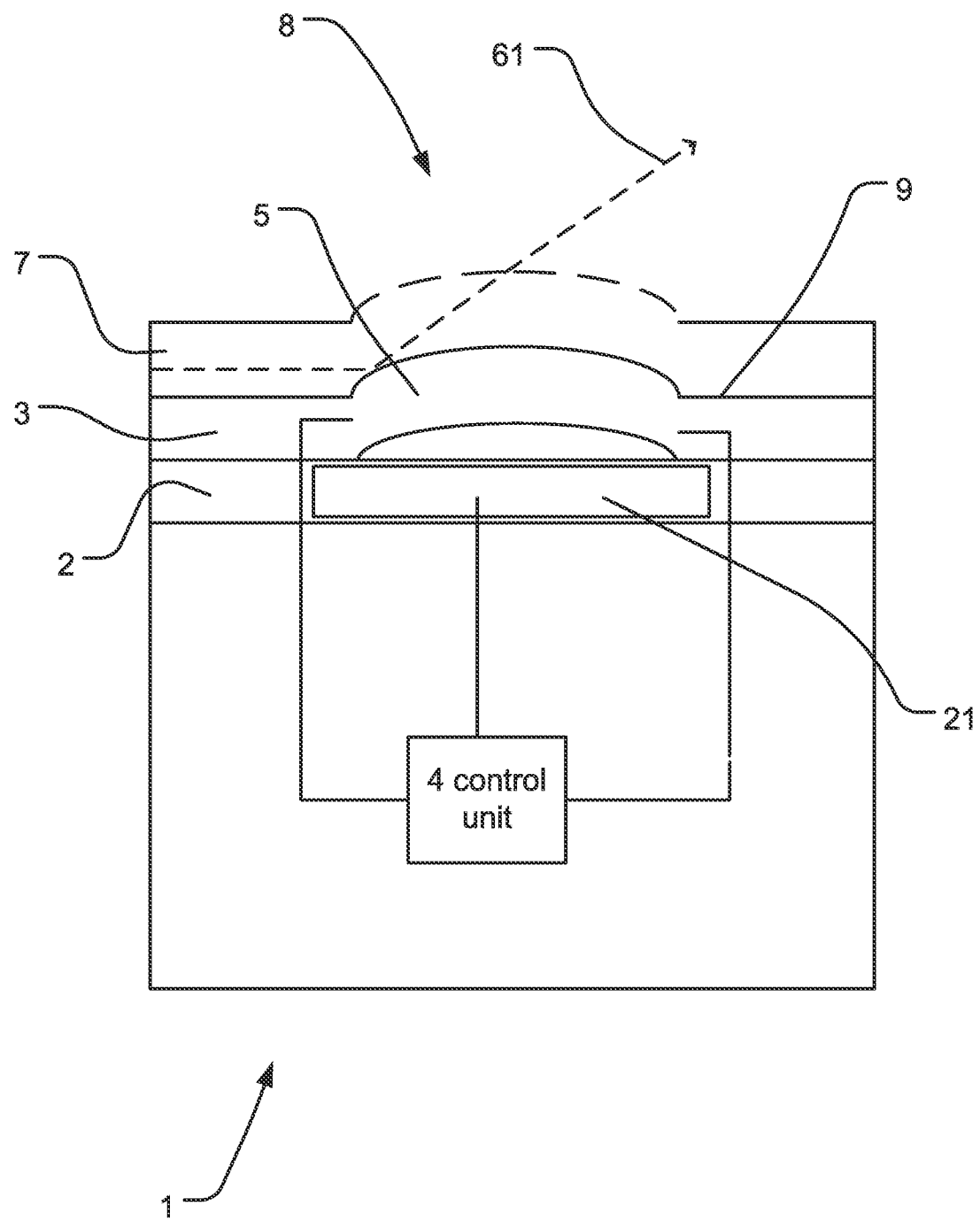
FIG. 3 illustrates a cross section of one side of a mobile electronic device where the present invention is implemented.

FIG. 3 illustrates a cross section of a portion of one side of the mobile electronic device 1 showing a dynamic hardware control 8 according to the invention comprising a deformable segment 5 in a deformed state and wherein the mobile electronic device further comprises a separate light guide layer 7 attached to the outside of and adjacent to the electroactive polymer film 3 and functioning as a dedicated light guide being transparent and flexible enabling it to deform according to the deformation of the deformable segment 5. Preferably, the light guide layer 7 is a transparent polymer, e.g. PC or PMMA. When deformed, the light is redirected and can escape through the outer surface of the light guide layer 7 and become visible to a user. The light guide layer 7 may comprise perforations in an outer layer, enabling light to pass through to a user.

Figure 4:
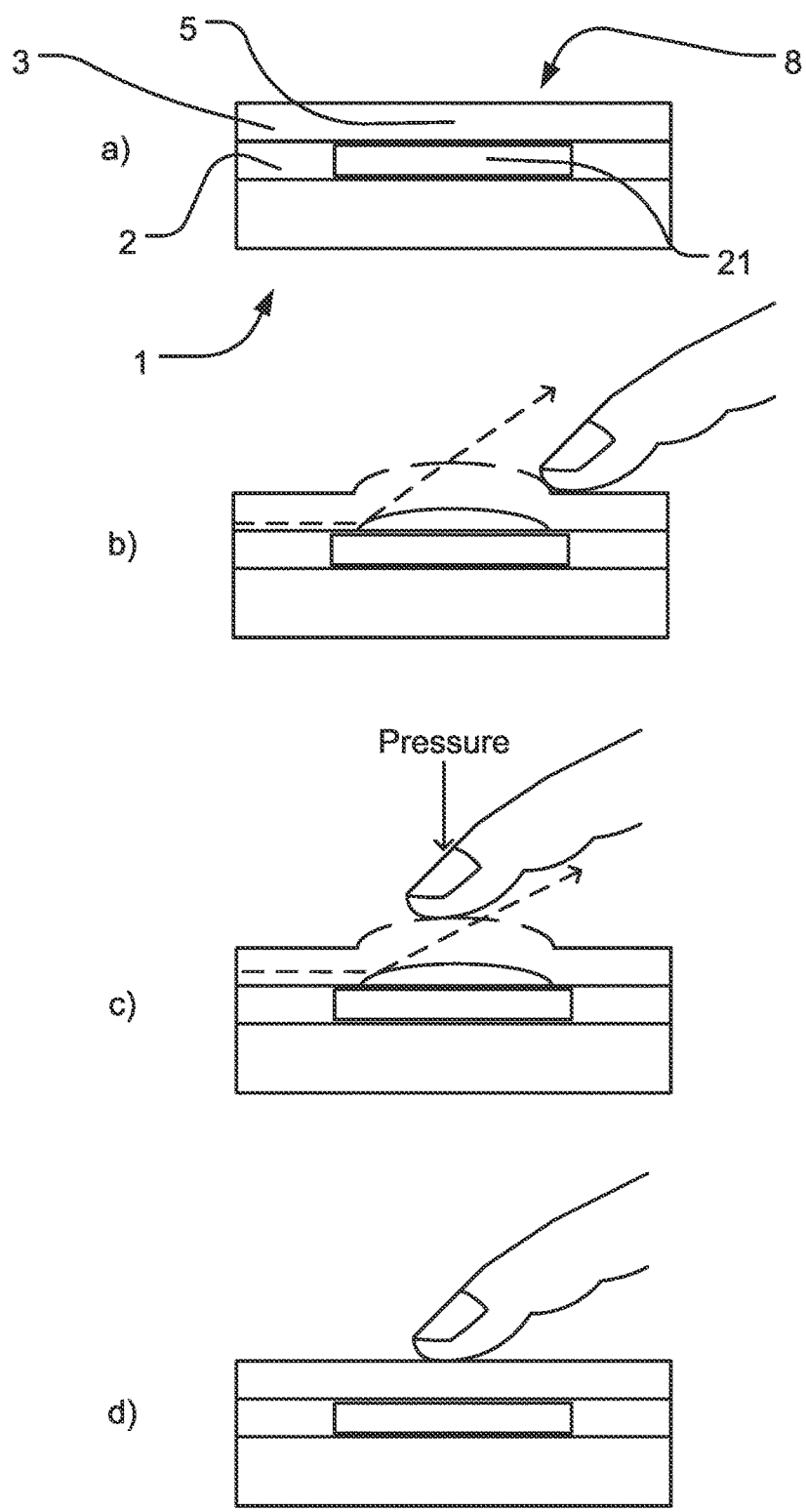
FIG. 4 illustrates a typical use case of the present invention.

FIG. 4 illustrates a cross-section of a portion of one side of the mobile electronic device 1 and a dynamic hardware control 8 during a typical use case scenario of the present invention. In a) the electroactive polymer film 3 is active and in an idle mode, scanning for a pressure on the pressure sensing segment 21. The scanning is performed at a certain frequency depending on the mode of the mobile electronic device 1 and amount of segments 21 to be scanned. In a further example, the scanning frequency when active varies between 5 to 10 Hz. For instance, if the mobile electronic device 1 is in a battery saving mode the scanning may be performed at a lower frequency and thereby optimizing battery time. If an object e.g. a finger or a stylus is detected, the frequency can be increased to achieve higher precision in the control of the voltage applied over the deformable segment 5. If the mobile electronic device 1 is in a rest mode or locked mode, scanning can be switched off completely. In b), an object is detected by the pressure sensing segment 21 and a voltage is instantly applied to the corresponding deformable segment 5. Simultaneously as the detection of a pressure is the at least one light source 6 switched on, providing light that is redirected by the deformed deformable segment 5 and thereby becomes visible to a user and indicating an active dynamic hardware control 8. In c), the user has recognized the dynamic hardware control 8 and provides a pressure on the upper surface of said dynamic hardware control 8. The pressure is scanned by the pressure sensing segment 21 and compared to a pressure threshold. If the pressure exceeds the threshold value, which value can be varied by software or a user, the deformable segment 5 is reset, as in d), to a non-deformed state by removal of the voltage to the deformable segment 5. In the invention, the polarity of the voltage applied to the deformable segment 5 may be reversed for enhanced and faster resetting a deformed deformable segment. Following or simultaneously as the resetting occurs, a software key input event is executed to perform a task that is associated with said dynamic hardware control 8. The pressure threshold may in the invention be varied such that between 1 Newton and 15 Newtons of equivalent force on the dynamic hardware control 8 is required to reset it. The light source 6 may in the invention be switched off simultaneously. If the pressure is maintained after the reset of the deformable segment 5, the software key input event may be executed repeatedly/continuously until the pressure is removed.

Furthermore, the software key input event associated with a dynamic hardware control 8 may be controlled and altered by a user or an application/program on the mobile electronic device 1. If the user e.g. wants to be able to raise the volume of a speaker on the mobile electronic device by pressing a certain portion on the side of the mobile electronic device 1, the user may associate the dynamic hardware control 8 at that portion with the software key input event of raising the volume. Another example is when using a camera application in the mobile electronic device, the trigger function may be associated to a particular dynamic hardware control 8 by determining how the mobile electronic device 1 is oriented, e.g. by use of an accelerometer and/or gyroscope, and thereby activating a dynamic hardware control 8 on a side of the mobile electronic device 1 facing upwards and associating it with software key input event of a trigger function of the camera function.

Figure 5:
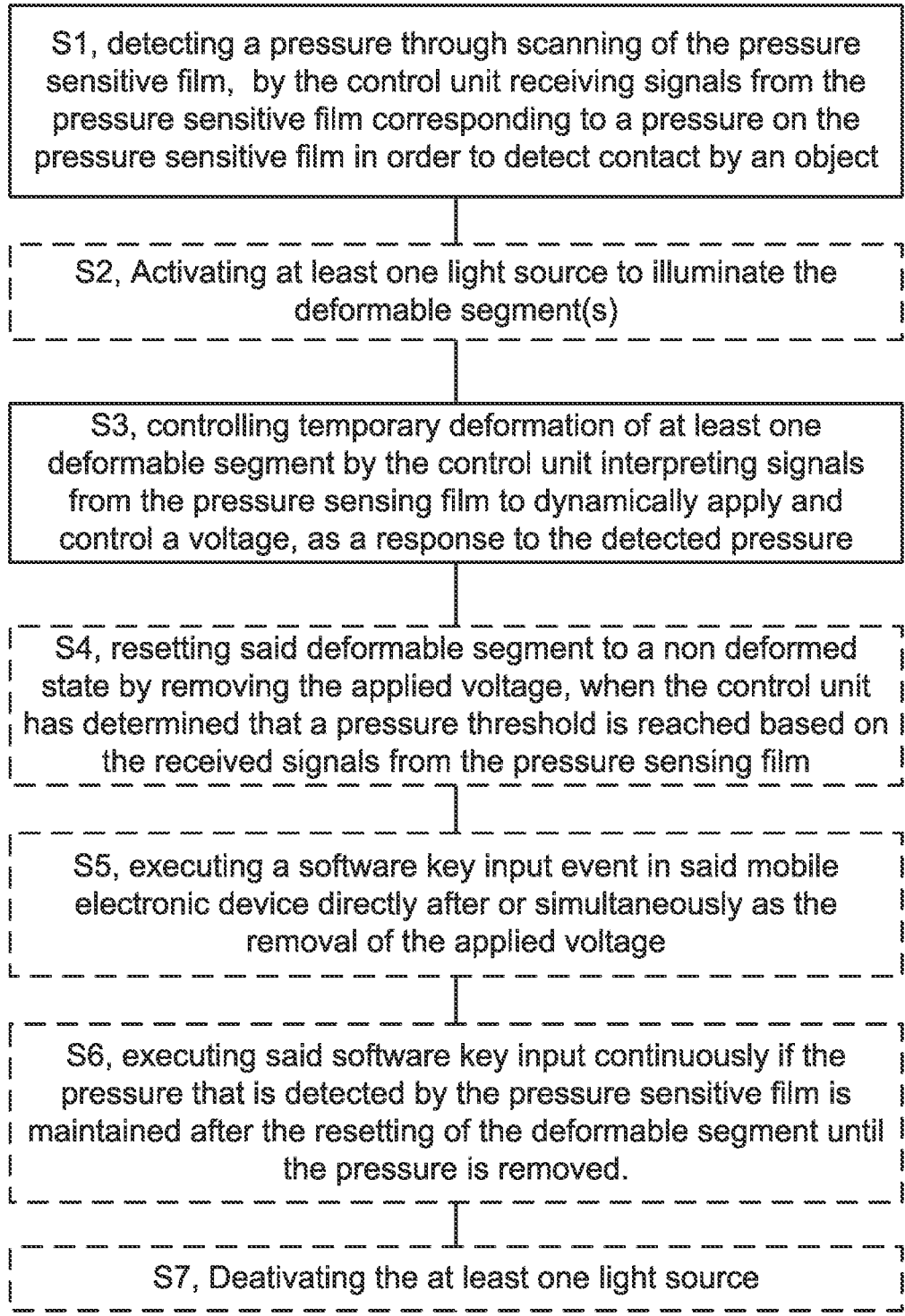
FIG. 5 illustrates a flowchart of a method for dynamically controlling at least one deformable segment.

FIG. 5 illustrates a flowchart of a method for controlling for controlling dynamic hardware controls according to the present invention. The method is implemented in a mobile electronic device when the mobile electronic device is in an active mode for receiving input from a user. Step 1, S1, includes detecting a pressure through scanning of the pressure sensitive film 2, by the control unit 4 receiving signals from the pressure sensitive film 2 corresponding to a pressure on the pressure sensitive film 2 in order to detect contact by an object. Scanning may be performed by detecting changes in capacitance and/or resistance or the like in a single pressure sensitive segment 21. In the invention, capacitive parallel plate sensors are used for the detection of pressures. The scanning may further be controlled by a user or software application executed by the control unit 4 to only scan for pressures on selected active pressure sensing segments 21. The pressure sensing segments 21 are positioned in predetermined positions on at least one side of the mobile electronic device 1, enabling the user or software application to select which position(s) and corresponding portions of at least one side of the mobile electronic device 1 to be active for generation of dynamic hardware controls 8.

Step 2, S2, comprises activating at least one light source 6 to illuminate the deformable segment(s) 5. By activating the light source 6, the deformable segment(s) 5 will be illuminated immediately as they deform.

Step 3, S3, includes controlling temporary deformation of at least one deformable segment 5 by the control unit 4 interpreting signals from the pressure sensing film 2 to dynamically apply and control a voltage, as a response to the detected pressure. The controlling is performed by measuring a change in capacitance and/or resistance over a pressure sensing segment 21, first to indicate that an object is in contact with the mobile electronic device 1 at the predetermined position of the pressure sensing segment 21 that has detected said change, after which the control unit 4 controls the voltage over the deformable segment 5 to achieve the desired deformation. The voltage required for deforming a deformable segment 5 in an electroactive polymer film is low making it easily achievable within the mobile electronic device 1. The voltage may be applied according to a software setting, user preference or to the pressure detected by the pressure sensing segment 21.

Step 4, S4, comprises resetting said deformable segment 5 to a non-deformed state by removing the applied voltage, when the control unit 4 has determined that a pressure threshold is reached based on the received signals from the pressure sensing film 2. By analyzing the change in capacitance and/or resistance over a pressure sensing segment 21 in the pressure sensing film 2, the control unit 4 may determine that the threshold is reached and thereby remove the applied voltage to the corresponding deformable segment 5. The voltage may be removed instantly or gradually over a predetermined time to simulate the pressing of a mechanical button. The polarity of the applied voltage may in the invention be reversed for a short period of time in order to achieve a faster resetting of the deformable segment 5.

Step 5, S5, comprises executing a software key input event in said mobile electronic device 1 directly after or simultaneously as the removal of the applied voltage to the deformable segment 5. Step 6, S6, comprises executing said software key input continuously if the pressure that is detected by the pressure sensitive film 2 is maintained after the resetting of the deformable segment 5 until the pressure is removed. The software key input event may be any input recognizable by the control unit 4 and may be determined by a software application or a user in advance. For instance, a user may want to change the physical position of the dynamic hardware control associated with an "increase volume" software key input event to make it easier to reach. The user may then select, in the user interface of the mobile electronic device 1, another position for that software key input event by associating a dynamic hardware control at a desired position with the software key input event of increasing the volume.

Step 7, S7, comprises deactivating the at least one light source 6 following the resetting of the deformable segment 5.

The disclosure is not limited to the specific flowchart presented, but includes all variations within the scope of the present claims.

As will be realized, the disclosure is capable of modification in various obvious respects, all without departing from the scope of the appended claims. Accordingly, the drawings and the description thereto are to be regarded as illustrative in nature, and not restrictive.

The invention claimed is:

1. A mobile electronic device comprising:
   a pressure sensing film arranged to detect a pressure applied on at least one portion of at least one side of the mobile electronic device:

an electroactive polymer film, with a conductive coating, arranged overlaying the pressure sensing film comprising at least one segment not being attached to the pressure sensing film thereby forming deformable segments configured to be temporarily deformed by the application of a voltage over the at least one deformable segment in the electroactive polymer film; and a control unit configured to interpret signals associated with the detected pressure, received from the pressure sensing film, and to variably control the voltage applied over said at least one deformable segment, thereby controlling a varying amount of deformation or pressure resistance of said at least one deformable segment as a function of the applied pressure detected by the pressure sensing film, wherein the electroactive polymer film is transparent, and configured to function as a light guide for at least one light source comprised within the mobile electronic device in order to illuminate the at least one deformable segment, and wherein the deformable segments in the electroactive polymer film, when deformed, are configured to redirect the light outwards at an angle against the outer surface of the electroactive polymer that enables light to escape out of the electroactive polymer film.

2. A mobile electronic device according to claim 1, wherein the pressure sensitive film comprises a plurality of pressure sensing segments each segment being configured to detect an individual pressure on a predetermined portion of a side of the mobile electronic device and wherein the electroactive polymer film comprises a plurality of deformable segments.

3. A mobile electronic device according to claim 2, wherein each pressure sensing segment is a parallel plate capacitor or a resistive sensor configured to detect a contact pressure of an object being in contact with a portion of the mobile electronic device.

4. A mobile electronic device according to claim 2, wherein a plurality of the deformable segments are arranged in desired positions on at least one side of the mobile electronic device aligned with positions of underlying corresponding pressure sensing segments and wherein the deformable segments are arranged to individually deform such that they together with underlying pressure sensing segments form dynamic hardware controls on at least one side of the mobile electronic device.

5. A mobile electronic device according to claim 3, wherein a plurality of the deformable segments are arranged in desired positions on at least one side of the mobile electronic device aligned with positions of underlying corresponding pressure sensing segments and wherein the deformable segments are arranged to individually deform such that they together with underlying pressure sensing segments form dynamic hardware controls on at least one side of the mobile electronic device.

6. A mobile electronic device according to claim 4, wherein each deformable segment is dimensioned to be smaller than an underlying corresponding pressure sensing segment.

7. A mobile electronic device according to claim 5, wherein each deformable segment is dimensioned to be smaller than an underlying corresponding pressure sensing segment.

8. A mobile electronic device according to claim 1, wherein the mobile electronic device further comprises a light guide layer being transparent and functioning as a light guide for at least one light source to let light escape out through the light guide layer and become visible to a user.

9. A mobile electronic device according to claim 8, wherein the light guide layer is positioned outside and adjacent to the electroactive polymer film and configured to redirect the light outwards from the light guide layer to let light escape out through the light guide layer and become visible to a user.

10. A mobile electronic device according to claim 9, wherein the light guide layer is attached to the electroactive polymer film and configured to redirect the light outwards at an angle against an outer surface of the light guide layer that is sufficient to ensure light to escape out through the outer surface of the light guide layer and become visible to a user.

11. A mobile electronic device, comprising:

a pressure sensing film arranged to detect a pressure applied on at least one portion of at least one side of the mobile electronic device:

an electroactive polymer film, with a conductive coating, arranged overlaying the pressure sensing film comprising at least one segment not being attached to the pressure sensing film thereby forming deformable segments configured to be temporarily deformed by the application of a voltage over the at least one deformable segment in the electroactive polymer film; and a control unit configured to interpret signals associated with the detected pressure, received from the pressure sensing film, and to variably control the voltage applied over said at least one deformable segment, thereby controlling a varying amount of deformation or pressure resistance of said at least one deformable segment as a function of the applied pressure detected by the pressure sensing film, wherein the electroactive polymer film is transparent, and configured to function as a light guide for at least one light source comprised within the mobile electronic device in order to illuminate the at least one deformable segment, and wherein each deformable segment in the electroactive polymer film comprises at least one perforation in at least an outer conductive coating layer configured to let light to escape through the conductive coating layer and become visible to a user.

12. A method for controlling dynamic hardware controls on a mobile electronic device comprising a pressure sensing film arranged to detect the pressure on at least one portion of at least one side of the mobile electronic device and an electroactive polymer film, with a conductive coating, arranged overlaying the pressure sensing film, comprising at least one segment not being attached to the pressure sensing film thereby forming deformable segments that may be deformed temporarily by the application of a voltage over the at least one deformable segment in the electroactive polymer film, the mobile electronic device further comprises a control unit, wherein the method comprises the steps of:

detecting a pressure through scanning of the pressure sensitive film, by the control unit receiving signals from the pressure sensitive film corresponding to a pressure on the pressure sensitive film in order to detect contact by an object;

controlling temporary varying amounts of deformation or pressure resistance of at least one deformable segment by the control unit interpreting signals from the pressure sensing film to variably apply and control a voltage, as a function of the detected pressure;

resetting said deformable segment to a non-deformed state by removing the applied voltage, when the control unit has determined that a pressure threshold is reached based on the received signals from the pressure sensing film;

executing a software key input event in said mobile electronic device directly after or simultaneously as the removal of the applied voltage; and executing said software key input continuously if the pressure that is detected by the pressure sensitive film is maintained after the resetting of the deformable segment until the pressure is removed.

13. The method for controlling dynamic hardware controls on a mobile electronic device according to claim 12, wherein the detection of pressure by the pressure sensitive film is performed by scanning for individual pressures on a plurality of pressure sensing segments.

14. The method for controlling dynamic hardware controls on a mobile electronic device according to claim 13, wherein the method further comprises determining by a user or software application which pressure sensing segments and deformable segments that are active and deformation of said active deformable segments initiated by other means than detection of pressure on the pressure sensitive film.

15. The method for controlling dynamic hardware controls on a mobile electronic device according to claim 12, wherein a user or software may determine what software key input event that is to be executed when a certain dynamic hardware control is pressed with sufficient force to reach the pressure threshold.

16. The method for controlling dynamic hardware controls on a mobile electronic device according to claim 12, wherein the method further comprises switching on a light source to illuminate the deformable segment when the deformable segment is deformed and switching off the light source when the deformable segment is reset.

* * * * *